United States Patent
Hippen et al.

(10) Patent No.: US 9,906,102 B2
(45) Date of Patent: Feb. 27, 2018

(54) INSULATION IN AN ELECTRIC MACHINE

(71) Applicant: BorgWarner Inc., Auburn Hills, MI (US)

(72) Inventors: Will Robert Nielsen Hippen, Santa Cruz, CA (US); Christopher Meszaros, Brighton, MI (US); Tyler Garrard, Buellton, CA (US); Diana Brehob, Dearborn, MI (US)

(73) Assignee: BorgWarner Inc., Auburn Hills, MI (US)

( * ) Notice: Subject to any disclaimer, the term of this patent is extended or adjusted under 35 U.S.C. 154(b) by 222 days.

(21) Appl. No.: 14/634,942

(22) Filed: Mar. 2, 2015

(65) Prior Publication Data
US 2015/0256051 A1  Sep. 10, 2015

Related U.S. Application Data

(60) Provisional application No. 61/949,731, filed on Mar. 7, 2014.

(51) Int. Cl.
*H02K 9/00* (2006.01)
*F02C 6/12* (2006.01)
*F02C 9/00* (2006.01)
*H02K 5/20* (2006.01)
(Continued)

(52) U.S. Cl.
CPC ............. *H02K 9/00* (2013.01); *F01D 25/145* (2013.01); *F02C 6/12* (2013.01); *F02C 7/24* (2013.01);
(Continued)

(58) Field of Classification Search
CPC .. H02K 9/00; H02K 9/19; H02K 5/20; H02K 2205/09; H02K 7/14; F01D 25/145; F02C 7/24; F02C 9/00; F02C 6/12; F05D 2240/14; F05D 2240/40
USPC .......................................................... 60/608
See application file for complete search history.

(56) References Cited

U.S. PATENT DOCUMENTS 2,417,195 A * 3/1947 Hargreaves ............... F16B 7/20
220/319
2,836,740 A * 5/1958 Gibson .................... H01B 3/46
310/45
(Continued)

FOREIGN PATENT DOCUMENTS

WO   WO 2013122857 A1 *  8/2013  ............. F01D 25/16
WO   WO 2013126232 A1 *  8/2013  ............. F01D 25/12

*Primary Examiner* — Jason Shanske
*Assistant Examiner* — Jason T Newton
(74) *Attorney, Agent, or Firm* — Barnes & Thornburg LLP

(57) ABSTRACT

It is common in electric machines to use the housing as a heat sink to remove energy from the electric machine. In some applications, however, the housing receives energy from a hot element. For example, in an electronically controlled turbocharger, the very hot turbine housing radiates and conducts energy to the electric machine housing exacerbating the heating within the electric machine. To reduce the heat transfer into the electric machine, a gap is provided between the stator and the housing outside the stator. In one alternative, the gap is filled with an insulating material. In another embodiment, the gap is an air gap with the stator located within the housing by circumferential rings or axial rods in corresponding grooves. In yet another embodiment, coolant is provided to the gap at the top and drained away at the bottom under the action of gravity.

16 Claims, 3 Drawing Sheets

(51) Int. Cl.
F01D 25/14 (2006.01)
F02C 7/24 (2006.01)
H02K 9/19 (2006.01)
H02K 7/14 (2006.01)

(52) U.S. Cl.
CPC ............... F02C 9/00 (2013.01); H02K 5/20 (2013.01); H02K 9/19 (2013.01); F05D 2220/40 (2013.01); F05D 2240/14 (2013.01); H02K 7/14 (2013.01); H02K 2205/09 (2013.01)

(56) References Cited

U.S. PATENT DOCUMENTS

| | | | | |
|---|---|---|---|---|
| 3,192,861 A * | 7/1965 | Haegh | ............... | H02K 5/128 310/52 |
| 3,766,416 A * | 10/1973 | Papst | ............... | H02K 1/185 310/216.004 |
| 4,293,785 A * | 10/1981 | Jackson, Jr. | ............ | F28F 13/18 165/133 |
| 5,121,605 A * | 6/1992 | Oda | ............ | F01D 5/10 290/52 |
| 5,605,045 A * | 2/1997 | Halimi | ............... | F01D 5/085 310/52 |
| 7,673,452 B2 * | 3/2010 | Shimizu | ............... | F01D 25/12 290/52 |
| 8,336,328 B2 * | 12/2012 | Nakazeki | ............... | F16C 19/54 62/401 |
| 9,470,231 B2 * | 10/2016 | Diemer | ............... | F02B 39/10 |
| 2010/0175377 A1 * | 7/2010 | Hippen | ............... | F02B 37/10 60/602 |
| 2010/0247343 A1 * | 9/2010 | Shimizu | ............... | F01D 25/12 417/410.1 |
| 2012/0025636 A1 * | 2/2012 | Roopnarine | ............. | H02K 1/02 310/46 |
| 2014/0171330 A1 * | 6/2014 | Kummeth | ............... | H02K 55/04 505/163 |

* cited by examiner

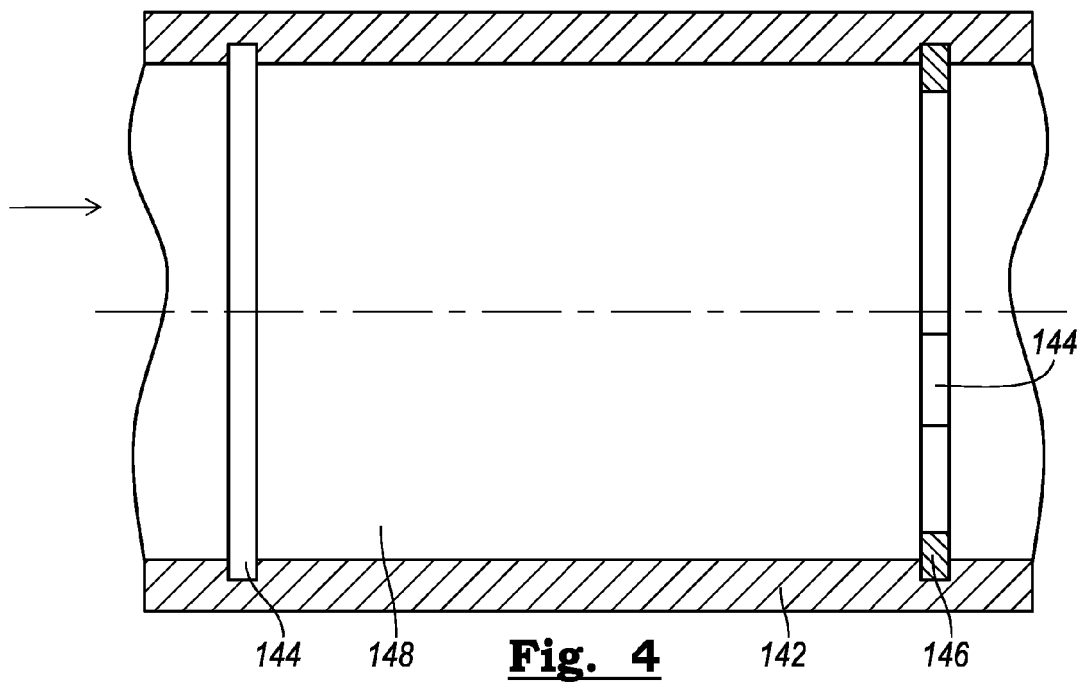
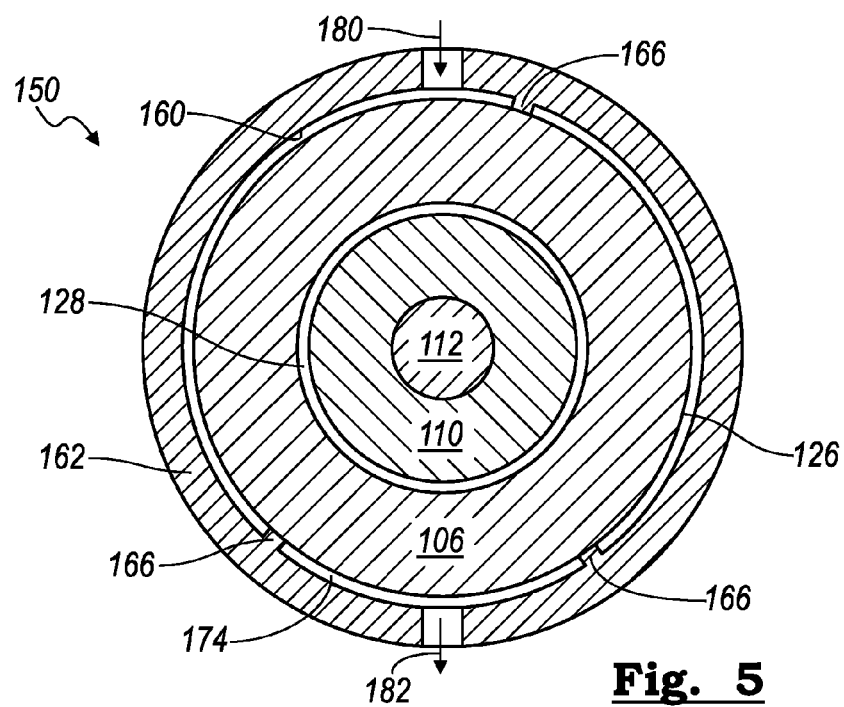

INSULATION IN AN ELECTRIC MACHINE

CROSS-REFERENCE TO RELATED APPLICATION

This patent application claims the benefit of, and priority to, U.S. Provisional Patent Application Ser. No. 61/949,731, filed Mar. 7, 2014, the disclosure of which is incorporated herein by reference in its entirety.

FIELD

The present disclosure relates generally to an electric machine assembly in which insulation is provided between the housing and the electric machine.

BACKGROUND AND SUMMARY

Electric machines may be operated as an electric motor or an electric generator. In either conversion: electricity to mechanical energy or mechanical energy to electricity, there are losses which lead to heating of the electric machine. Often, a housing in which the electric machine is disposed serves as a heat sink, in which case, the interface between the electric machine and the housing is designed to promote heat transfer. Sometimes, the housing has fins on its outer surface to increase heat transfer to the environment. In some applications, the electric machine is in the vicinity of elements which are at a higher temperature than the housing such that energy is transferred into the electric machine further exacerbating overheating of the machine and putting an additional strain on cooling the machine. In such applications, decreasing heat transfer between the electric machine and the housing is desirable. One such configuration in which a hot element is proximate the housing of the electric machine is an electronically controlled turbocharger (ECT) in which the turbine housing may attain temperatures exceeding 1000° F. As the electric machine housing is cooler than that, the turbine housing radiates to the electric machine housing.

To overcome at least one problem in the prior art, an electric machine is provided that has a housing having an inner surface with at least part of the inner surface forming a substantially cylindrical cavity, a first end cavity, and a second end cavity; first and second bearings mounted in the housing; a shaft mounted within the first and second bearings; a rotor affixed to the shaft and located between the first and second bearings; and a stator disposed in the housing. The stator has a substantially cylindrical outer surface. There is a gap between the substantially cylindrical cavity of the housing and the substantially cylindrical outer surface of the stator. The gap exists over a majority of the substantially cylinder outer surface. The first end cavity is in fluidic communication with the gap. The second end cavity is in fluidic communication with the gap.

In some embodiments, the assembly may further include a sleeve inserted in the gap wherein the sleeve is comprised of a low thermal conductivity material.

In some embodiments, the inner surface of the housing has first and second circumferential grooves with a first split ring disposed in the first circumferential groove and a second split ring disposed in the second circumferential groove wherein the substantially cylindrical outer surface of the stator contacts inner surfaces of the first and second split rings. In another embodiment, the inner surface of the housing has first, second, and third axial grooves, with a first rod disposed in the first groove; a second rod disposed in the second groove; and a third rod disposed in the third groove wherein the substantially cylindrical outer surface of the stator contacts the inner surfaces of the first, second, and third rods. The rods may have a polygonal cross-sectional shape.

In some embodiments, multiple housing pieces couple together to form the housing.

In some alternatives, at least a portion of the inner surface of the housing and at least a portion of the substantially cylindrical outer surface of the stator have an anti-wetting coating applied. In other alternatives, a reflective coating is provided on at least: a portion of the inner surface of the housing or a portion of the substantially cylindrical outer surface of the stator.

The disclosure may be advantageously used in an electronically-controlled turbocharger (ECT) which includes: a shaft onto which a turbine wheel, a compressor wheel, and a rotor of an electric machine is affixed; a housing having a substantially cylindrical inner surface, a first end cavity, and a second end cavity; first and second bearings mounted onto the shaft with the housing mounted on the first and second bearings; and a stator disposed in the housing. The stator has a substantially cylindrical outer surface. A gap exists between the substantially cylindrical inner surface of the housing and the substantially cylindrical outer surface of the stator over a majority of the substantially cylinder outer surface of the stator. The gap is in fluid communication with the first end cavity. The gap is in fluid communication with the second end cavity.

In some embodiments, the ECT may have a low thermal-conductivity sleeve inserted in the gap.

In some embodiments, the cylindrical inner surface of the housing has first and second circumferential grooves with a first split ring disposed in the first circumferential groove and a second split ring disposed in the second circumferential groove. The outer surface of the stator contacts inner surfaces of the first and second split rings. In an alternative embodiment, the cylindrical inner surface of the housing has first, second, and third axial grooves with a first rod disposed in the first groove, a second rod disposed in the second groove, and a third rod disposed in the third groove.

In some alternatives, at least three standoffs extend inwardly from the inner surface of the housing and the outer surface of the stator is supported in the housing by the standoffs.

Also disclosed is an electric machine having a housing; first and second bearings mounted in the housing; a shaft mounted within the first and second bearings; a rotor affixed to the shaft and located between the first and second bearings; a stator disposed within the housing; and material disposed between the stator and the housing. At least a portion of an inside surface of the housing is substantially cylindrical; at least a portion of an outer surface of the stator is substantially cylindrical; and, in some embodiments, the material is a sleeve having low thermal-conductivity. In one non-limiting example, the material is a ceramic. In some embodiments the material is sprayed onto at least a section of the substantially cylindrical inside surface of the housing, such as with thermal-plasma spraying. The material has low thermal conductivity and/or high reflectivity.

According to embodiments disclosed herein, energy transferred to the electric motor via radiation and conduction from an external, high-temperature element, such as the turbine housing of a turbocharger, can largely be mitigated by insulating the stator or by dripping coolant between the stator and housing to extract energy.

BRIEF DESCRIPTION OF THE DRAWINGS

FIGS. 2, 3, and 5 are cross-sectional representations of several embodiments of an electric machine; and FIG. 4 is an illustration of an axial cross section of a portion of a housing for an electric machine.

DETAILED DESCRIPTION

Figure 1:
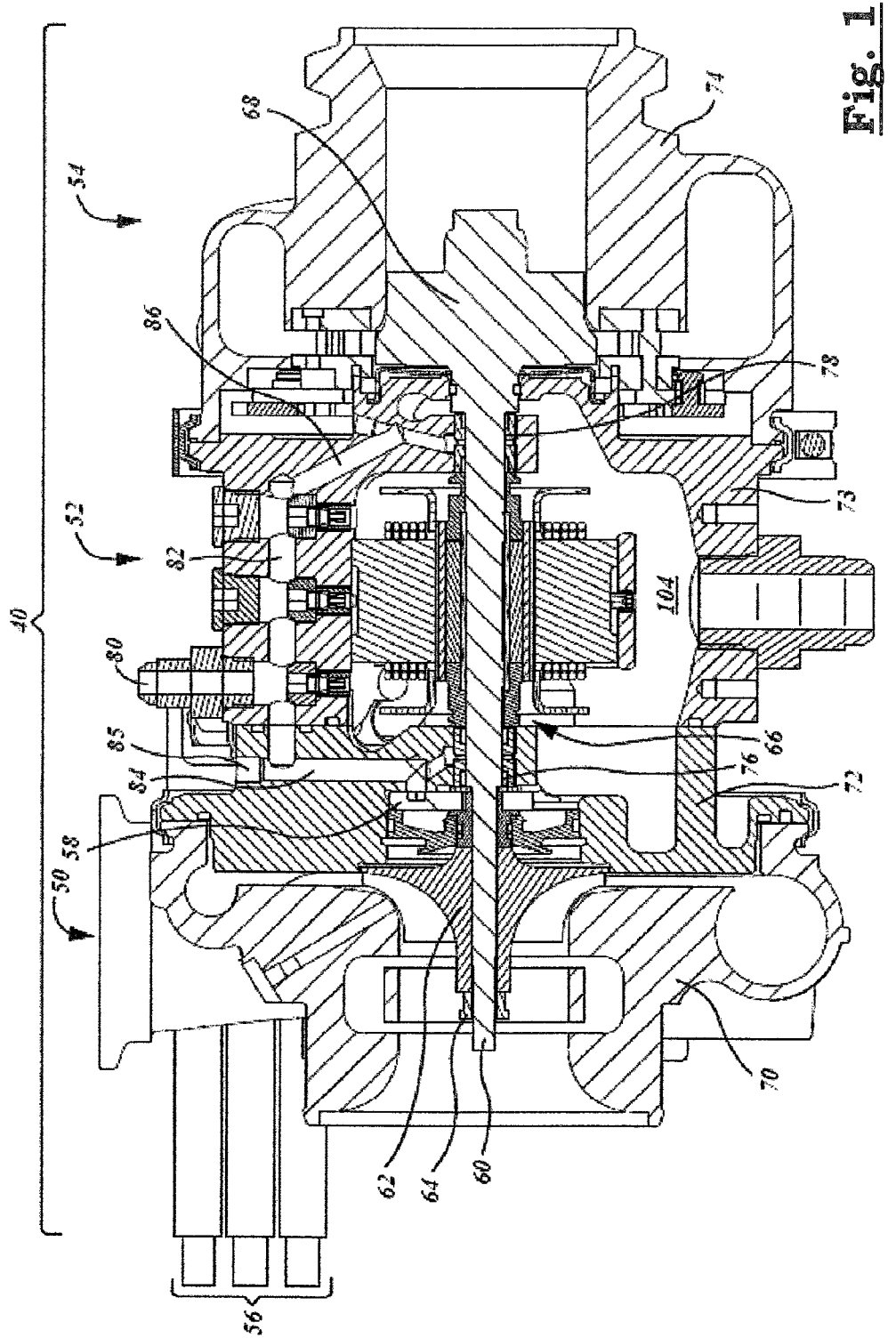
FIG. 1 is a cross-sectional representation of an electronically-controlled turbocharger (ECT) that includes a high-speed electric machine.

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

The present disclosure may be applied to any electric machine proximate a high temperature component, such as an electronically-controlled turbocharger (ECT). An ECT 40 is shown in cross section of an ECT 40 in FIG. 1. The ECT includes a compressor section 50, an electric machine section 52, and a turbine section 54. Coupled to a common shaft 60 are: a compressor wheel 62 fixed axially by nut 64, a rotor 66 of the electric machine, and a turbine wheel 68 (welded). Alternatively, turbine wheel 68 may be threaded onto shaft 60.

The embodiment in FIG. 1 includes four housing sections that are coupled together: a compressor housing section 70, two electric machine housing sections 72 and 73, and a turbine housing section 74. In other applications, the housing may include more or fewer sections. Rotating shaft 60 is supported in the housings by bearings 76 and 78. A thrust bearing 58 is provided between the compressor and the housing. An electrical connector 56, which couples with high power electronics (not shown), exits ECT 40.

Pressurized lubricant, which is engine oil in one embodiment, is provided to ECT 40 through inlet 80. Lubricant from inlet 80 fills manifold 82. Manifold 82 is fluidly coupled to oil passages 84 and 86 with passage 84 providing lubricant to bearing 76 and passage 86 providing lubricant to bearing 78. A plug 85 is provided at the outside end of passage 84 to seal off the drilling to form passage 84. Cooling of the electric machine is made more difficult as turbine housing section 74 radiates to electric machine housing sections 72 and 73.

Figure 2:
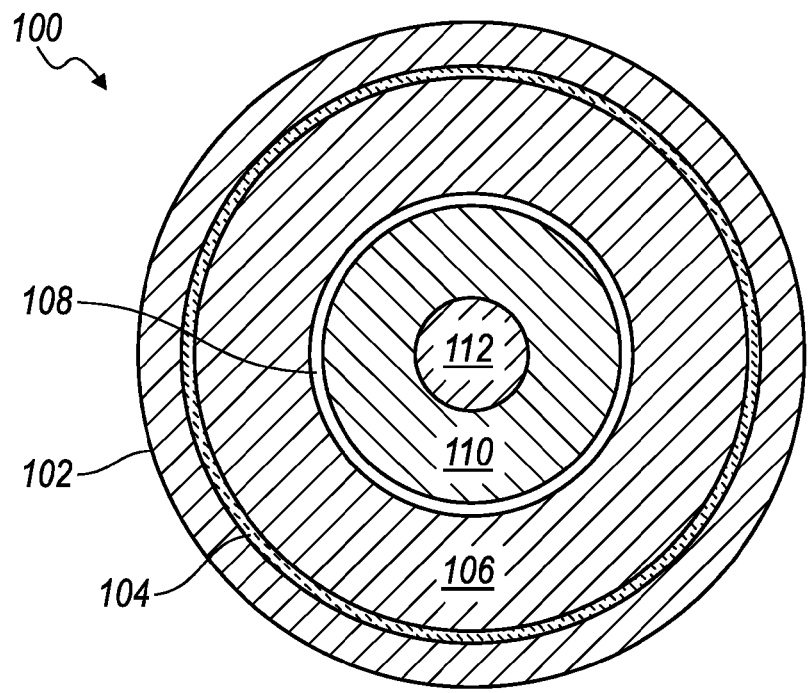

In FIG. 2, a cross-sectional illustration of an electric machine 100 shows a shaft 112 onto which a rotor 110 is affixed. A housing 102 into which a stator 106 is mounted has a low-conductivity sleeve 104 provided between an inside surface of housing 102 and an outside surface of stator 106. A gap 108 is provided between rotor 110 and stator 106. Low-conductivity sleeve 104 provides a thermal energy barrier between housing 102 and stator 106. Sleeve 104 may be formed out of a low-conductivity ceramic or any suitable material.

Figure 3:
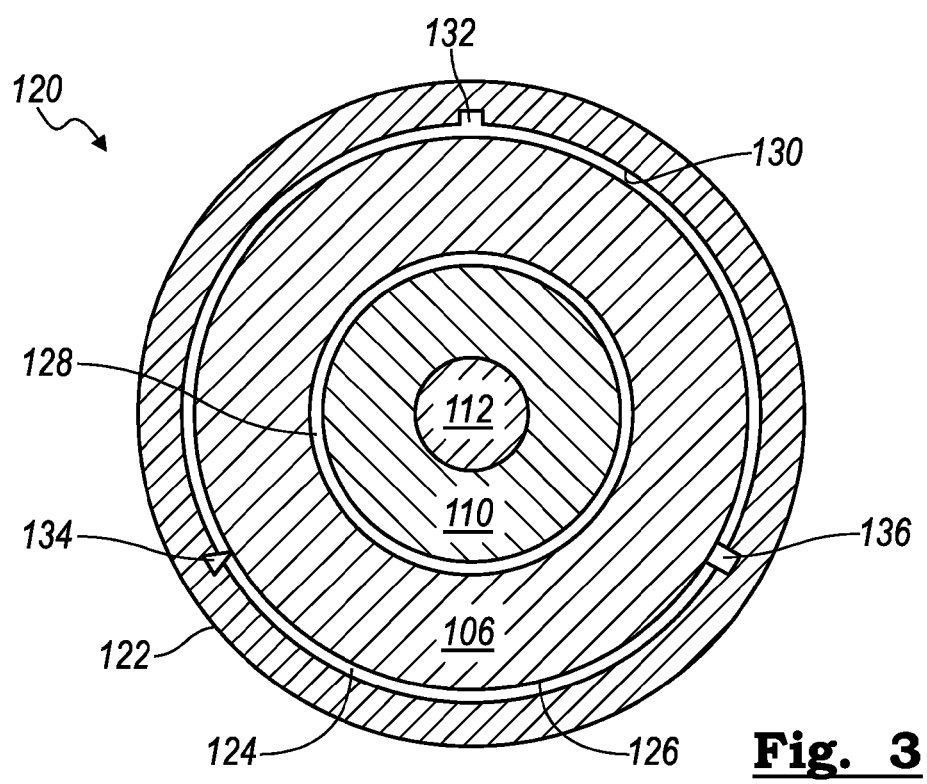

In another embodiment shown in cross-section in FIG. 3, a gap 124 is provided between an outside surface 126 of stator 106 and an inner surface 130 of a housing 122. Housing 122 has multiple axial grooves 132. A rectangular rod 136 is shown in one of the grooves. In an alternative embodiment, all of the grooves are filled with rectangular rods like 136. Another of the grooves in the illustration in FIG. 3 has a triangular rod 134. In such a situation, the groove can be reentrant with rod 134 slid into the reentrant groove and cannot be removed from the groove except by sliding it out through one of the ends. In another embodiment, all of the grooves are identical in cross section to accept the triangular rods. In such an embodiment, stator 106 is supported on the tips of the triangular rods having less area in contact with stator 106 than the rectangular rods.

In the embodiment in FIG. 3, there are three grooves. It is desirable to have the three grooves filled with rods to hold stator 106 in place. To properly restrain stator 106, three or more groove and rod pairs are provided. Furthermore, it is desirable to have the three grooves of the same cross-sectional shape. The illustration in FIG. 3 showing two groove types is merely to show two alternatives in one illustration and not intended to be limiting in any way.

In FIG. 4, a cross-section of a portion of a housing 142 is shown. Housing 142 is shown without a stator inside the housing. An arrow shows one example of the direction the stator would be inserted into housing 142 during assembly. Housing 142 has two circumferential grooves 144 on its inner surface. A split ring 146 is installed in one of the grooves. In one embodiment, split ring 146 has a greater diameter than groove 144 into which it is to be installed. Ends of the split in ring 146 are brought together to cause ring 146 to be small enough to fit into housing 142. Ring 146 is slid along the inner surface of housing 142 and then put into groove 144. When ring 146 expands into groove 144, the gap between the two ends become larger. To properly support a stator (not shown) in housing 142, a ring is provided at two grooves or more. In one embodiment, both of g In FIG. 5, an electric machine 150 is provided that has a housing 162 with an inner surface 160 from which standoffs 166 extend inwardly. A gap 174 is provided in between housing 162 and outer surface 126 of stator 106.

In embodiments in which there a gap exists between the inner surface (130, 148, 160) of the housing (122, 142, 162) and the outer surface (126) of the stator (106), such as FIGS. 2, 4, and 5, a radiation barrier may be applied to one or both the inner surface of the housing and the outer surface of the stator. For example, a reflective coating or sheathing may be applied to one or both of the surfaces.

In some embodiments, coolant can be provided to the gap and a drain provided for removal of the coolant. In FIG. 5, an inlet 180 is provided at the top and a drain 182 is provided in housing 162. Under the force of gravity, coolant provided to inlet 180 exits through drain 182. Energy is removed with the coolant.

In other embodiments in which a liquid is not provided to the gap on purpose, it is undesirable for a stagnant liquid to collect within the gap as it provides a path for energy conduction from the housing to the stator that is greater than a gap filled with air. Such liquid might leak from coolant and/or lubricant provided to other areas of the electric machine into that space. To remove unwanted liquid readily, the inner surface of the housing and the outer surface of the stator may be coated with an anti-wetting coating to cause the fluid to go to the lowest level within the gap. Drain 182, in FIG. 5, allows the unwanted liquid to drain away and not build up in the gap between housing and stator.

In another embodiment, an anti-wetting coating can be applied to the inner surface of the housing and the outer surface of the stator so that any fluid that contacts the surface is largely untouched by adsorption forces, in which case, the fluid acts under the forces of gravity to find the lowest point in the gap. A drain may be provided at the lowest point in the housing to allow any errant fluid to be removed from the gap.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

We claim:

1. An electric machine assembly, comprising:
   a housing having an inner surface with at least part of the inner surface forming a substantially cylindrical cavity, a first end cavity, and a second end cavity;
   first and second bearings mounted in the housing;
   a shaft mounted within the first and second bearings;
   a rotor affixed to the shaft and located between the first and second bearings;
   a stator disposed in the housing wherein the stator has a substantially cylindrical outer surface and a substantially cylindrical gap exists between the inner surface of the housing and the substantially cylindrical outer surface of the stator over a majority of the substantially cylindrical outer surface of the stator; and
   a thermal energy barrier material disposed in the gap.

2. The electric machine assembly of claim 1 wherein the inner surface of the housing has first and second circumferential grooves, the assembly further comprising:
   a first split ring disposed in the first circumferential groove; and
   a second split ring disposed in the second circumferential groove wherein the substantially cylindrical outer surface of the stator contacts inner surfaces of the first and second split rings.

3. The electric machine assembly of claim 1 wherein the inner surface of the housing has first, second, and third axial grooves, the assembly further comprising:
   a first rod disposed in the first groove;
   a second rod disposed in the second groove; and
   a third rod disposed in the third groove wherein the substantially cylindrical outer surface of the stator contacts the inner surfaces of the first, second, and third rods.

4. The electric machine assembly of claim 3 wherein the rods have a polygonal cross-sectional shape.

5. The electric machine assembly of claim 1 wherein the housing is comprised of multiple housing pieces coupled together; the first end cavity is in fluidic communication with the gap; and the second end cavity is in fluidic communication with the gap.

6. The electric machine assembly of claim 1 wherein a reflective coating is provided on at least one of: a portion of the inner surface of the housing and a portion of the substantially cylindrical outer surface of the stator.

7. An electronically-controlled turbocharger, comprising:
   a shaft onto which a turbine wheel, a compressor wheel, and a rotor of an electric machine is affixed;
   a housing having a substantially cylindrical inner surface, a first end cavity, and a second end cavity;
   first and second bearings mounted onto the shaft with the housing mounted on the first and second bearings;
   a stator disposed in the housing wherein:
   the stator has a substantially cylindrical outer surface;
   a substantially cylindrical gap exists between the substantially cylindrical inner surface of the housing and the substantially cylindrical outer surface of the stator over a majority of the substantially cylinder outer surface of the stator;
   the gap is in fluid communication with the first end cavity; and
   the gap is in fluid communication with the second end cavity; and
   a thermal energy barrier material disposed in the gap.

8. The electronically-controlled turbocharger of claim 7 wherein the cylindrical inner surface of the housing has first and second circumferential grooves, the electronically-controlled turbocharger further comprising:
   a first split ring disposed in the first circumferential groove; and
   a second split ring disposed in the second circumferential groove wherein the outer surface of the stator contacts inner surfaces of the first and second split rings.

9. The electronically-controlled turbocharger of claim 7 wherein the cylindrical inner surface of the housing has first, second, and third axial grooves, the electronically-controlled turbocharger further comprising:
   a first rod disposed in the first groove;
   a second rod disposed in the second groove; and
   a third rod disposed in the third groove wherein the outer surface of the stator contacts the inner surfaces of the first, second, and third rods.

10. The electronically-controlled turbocharger of claim 9 wherein the rods have a polygonal cross-sectional shape.

11. The electronically-controlled turbocharger of claim 7 wherein a reflective coating is provided on at least one of: a portion of the inner surface of the housing and a portion of the cylindrical outer surface of the stator.

12. The electronically-controlled turbocharger of claim 7 wherein at least three standoffs extend inwardly from the inner surface of the housing and the outer surface of the stator is supported in the housing by the standoffs.

13. An electric machine assembly, comprising:
   a housing;
   first and second bearings mounted in the housing;
   a shaft mounted within the first and second bearings;
   a rotor affixed to the shaft and located between the first and second bearings;
   a stator disposed within the housing; and
   a thermal energy barrier material disposed between the stator and the housing.

14. The electric machine assembly of claim 13 wherein at least a portion of an inside surface of the housing is substantially cylindrical; at least a portion of an outer surface of the stator is substantially cylindrical; and the thermal energy barrier material is a sleeve having low thermal-conductivity.

15. The electric machine assembly of claim 13 wherein the thermal energy barrier material is sprayed onto at least a section of the substantially cylindrical inside surface of the housing.

16. The electric machine assembly of claim 13 wherein the thermal energy barrier material has at least one of the properties: low thermal conductivity and high reflectivity.

* * * * *